United States Patent [19]

Brown

[11] Patent Number: 4,728,796
[45] Date of Patent: Mar. 1, 1988

[54] METHOD FOR IONIZATION OF POLYMERS

[75] Inventor: Charles E. Brown, Hubertus, Wis.

[73] Assignee: Medical College of Wisconsin, Milwaukee, Wis.

[21] Appl. No.: 850,293

[22] Filed: Apr. 10, 1986

[51] Int. Cl.$^4$ ............................................. H01T 27/24
[52] U.S. Cl. .............................. 250/423 P; 250/424; 250/425; 427/55
[58] Field of Search ................... 250/281, 282, 288 R, 250/284, 423 R, 423 P, 424, 425; 118/726, 620, 621; 427/53.1, 55

[56] References Cited

U.S. PATENT DOCUMENTS

| | | | |
|---|---|---|---|
| 4,214,159 | 7/1980 | Hillenkamp et al. | 250/288 |
| 4,297,434 | 10/1981 | Aviram | 430/270 |
| 4,458,148 | 7/1984 | Hirschfield et al. | 250/284 |
| 4,527,059 | 7/1985 | Benninghoven et al. | 250/288 |

FOREIGN PATENT DOCUMENTS

| | | | |
|---|---|---|---|
| 0074957 | 5/1982 | Japan | 250/423 P |
| 1136669 | 6/1986 | Japan | 427/53.1 |
| 2080027 | 1/1982 | United Kingdom | 250/398 |

OTHER PUBLICATIONS

Becker et al., Surface Analysis by Nonresonant Multphoton Ionization of Desorbed or Sputtered Species, Anal. Chem. 56, 1671-74 (1984).
Fassett et al., Laser Resonance Ionization Mass Spectrometry, Science, vol. 230, pp. 262-267 (Oct. 85).
Schulten et al., Applications of Mass Spectrometry to Polymers, Mass Spec. Rev., 3, 231-315, (1984).
Ambartzumian et al., Multiple PhotonInfrared Laser Photochemistry, Academic Press (1977).
Brown et al., Laser Desorption/Fourier Transform Mass Spectral Analysis of Various Conducting Polymers, "Proc. of Workshops on Conductive Polymers, Brokhaven Nat. Laboratory," (Oct. 1985).
Brown et al., Polynuclear and Halogenated Structures in Polyphenylenes Synthesized from Benzene, Bisphenyl, and p-Terphenyl under Various Conditions: Characterization by Laser Desorption/Fourier Transform Mass Spectrometry, Journal of Polymer Science, vol. 24, 255-67 (1986).
Brown et al., Laser Desorption/Fourier Transform Mass-Spectral Analysis of Molecular Weight Distribution and End-Group Composition of Poly (p--phenylene)s Synthesized by various Routes, Journal of Polymer Science, vol. 23, pp. 455-463, (1985).

Primary Examiner—Bruce C. Anderson
Assistant Examiner—Paul A. Guss
Attorney, Agent, or Firm—Quarles & Brady

[57] ABSTRACT

A method for the ionization of polymers which comprises forming a thick layer of the polymer on a probe tip and then ionizing the polymer in a vacuum with laser irradiation. In a preferred embodiment, a moiety that readily photoionizes in an IR field is incorporated into the thick layer of polymer and the irradiation of the thus modified polymer is done with a $CO_2$ IR laser. A method is also disclosed for the fabrication of polymer coatings which comprises accelerating the charged polymer ions generated by the ionization of a thick layer of polymer in a vacuum toward the substrate which has an appropriate charge gradient.

6 Claims, 5 Drawing Figures

METHOD FOR IONIZATION OF POLYMERS

FIELD OF THE INVENTION

The present invention relates to a method for the ionization of polymers. More particularly, it relates to a method for ionization which is useful in the analysis of polymers, the isolation of oligomers from polymer samples, and the fabrication of useful components by deposition of polymer ions onto surfaces.

BACKGROUND OF THE INVENTION

Mass spectrometry is used quite commonly to characterize polymers. However, it requires an ionization technique that causes little or no fragmentation of the sample molecules during ionization and a means of detecting the ions that yields high resolution in the high-mass range.

Field desorption, fast-atom bombardment and laser desorption are the ionization techniques most commonly used but all have difficulties with various polymers and field desorption and fast-atom bombardment cannot be used with insoluble materials. Laser desorption is thus the preferred technique especially for insoluble polymers.

The detection of ions can be accomplished with quadrupole, sector, time-of-flight, and Fourier transform mass spectrometers. However, quadrupole instruments are limited to detection of ions of low mass and, thus, are of little use for detecting polymers and sector instruments cannot be used readily with the pulsed ionization techniques used to ionize polymers. The time-of-flight instruments work well for detecting high-mass ions produced by pulsed ionization techniques but have inherent limitations regarding resolution. As a result, it is preferred to use laser desorption/Fourier transform mass spectrometry (LD/FTMS) in the field of a superconducting magnet.

The commonly assumed mechanism of laser desorption of thin films by a pulsed $CO_2$ laser involves the heating of the sample to form an ionized plasma. If heating of the sample by the laser pulse and the subsequent cooling by expansion into a vacuum chamber is sufficiently rapid, then molecules are moved into the gas phase with little or no bond breakage. Ionization may occur either as the sample molecules are removed from the polymer surface on a probe tip or by the interaction of the molecules with other particles in the plasma. The addition of a cationic species, such as $Na^+$ or $K^+$, to the polymer sample on the probe tip is known to enhance the formation of the sodium or potassium adduct molecular ion. Thus, the severity of the desorption conditions needed to produce ions, and therefore the extent of fragmentation, can be decreased by codepositing KBr onto the probe tip with polymer solutions. This procedure does not work with all polymers. Therefore, other techniques are needed for ionization of polymers which fragment readily and of the so-called "intractable" polymers which are insoluble, resistant to oxidation, thermal degradation and radiation.

SUMMARY OF THE INVENTION

It is the general object of the present invention to disclose a method for the ionization and detection of ions of polymers.

It is also an object to disclose a method of ionizing difficult to ionize polymers without causing significant fragmentation.

It is still further an object to disclose a method of ionization of polymers which results in molecular ions as the predominant species.

It is a further object to disclose a method of ionizing difficult to ionize polymers that permits thin coatings of such polymers to be deposited onto substrate surfaces.

The method of the present invention basically comprises first forming a thick layer (i.e., at least about 0.03 mm with no upper limit) of the polymer on a probe tip. The thick layer may be formed by compacting or compressing the powdered polymer onto the probe or by use of double sided tape or any other suitable technique that results in a thick layer that can be used in the method. If necessary, an organic moiety that readily photoionizes may be incorporated into the polymer before forming the thick layer. The thick layer of the polymer on the probe tip is then irradiated in a vacuum with a laser to produce ions. The mass spectra of the ions of the polymer can then be recorded and the ions separated on the basis of mass and charge. The ionization method also can be used to generate ions that are subsequently deposited onto a substrate by accelerating the polymer ions toward the substrate with an appropriate charge gradient.

In a preferred embodiment, a moiety that readily photoionizes in an infrared [IR] field (e.g., a conjugated aromatic compound that is similar in structure to laser dyes) is incorporated into the polymer before forming the thick layer. The polymer then is placed in a vacuum and irradiated with a pulsed IR laser. The ions thus produced are analyzed by Fourier transform mass spectrometry. Ions may be separated on the basis of mass and charge and the appropriate polymer ions can be deposited onto a target substrate by acceleration through a potential gradient to form a thin coating of the polymer on the substrate.

We have found that pulsed, high power (e.g., $CO_2$, 10.6 $\mu$m, about $10^7$–$10^9$ Watts/cm$^2$) IR-laser irradiation of thick layers of benzenoid and heterocyclic aromatic polymers yields molecular ions as the predominant species, and that these ions can be detected with better than unit mass resolution by Fourier transform mass spectrometry. Differences involving molecular weight distribution of hydrocarbon oligomers and their halogenated counterparts, as well as the nature of end-group structures, are readily determined. This finding provides a new approach for the ionization of polymers for detection by mass spectrometry.

BRIEF DESCRIPTION OF THE INVENTION

DESCRIPTION OF THE PREFERRED EMBODIMENT

In the preferred embodiment of the present invention a novel chemical moiety that readily photoionizes in an infrared [IR] field is incorporated into the polymer to be ionized and the sample is irradiated with an IR laser. The ions which are released may be analyzed and/or separated on the basis of mass and charge and, if desired, deposited onto a target substrate.

The following is a description of the procedures which are employed in the inventive method.

Ionization of Polymers

Samples are usually deposited onto a probe tip for laser desorption by coating the tip with a solution of the polymer and evaporating off the solvent. This procedure yields a thin film. The commonly assumed mechanism of desorption of such thin film is by a pulsed IR laser heating the sample to form an ionized plasma. If sample heating by the laser pulse and subsequent cooling by expansion into the vacuum chamber is sufficiently rapid, then molecules are moved into the gas phase with little or no bond breakage. Ionization may occur either as the sample molecules are removed from the surface of the probe tip or by interaction with other particles in the plasma.

The severity of the desorption conditions needed to produce ions, and therefore the extent of fragmentation, is decreased in many cases by codepositing KBr onto the probe tip with the sample of interest. Addition of the $K^+$ ion enhances formation of the potassium adduct molecular ion. This technique is very useful for obtaining LD/FT mass spectra of aliphatic polymers, especially if they contain heteroatoms and can be deposited onto the probe tip from solution. This technique, however, has limited application with insoluble intractable polymers, since the $K^+$ ions need to be in intimate contact with the polymer molecules in order to produce adduct molecular ions.

In the preferred method, an intractable polymer, e.g., a benzenoid or heterocyclic aromatic polymer is powdered and physically packed or compacted onto a probe tip as a thick layer of at least about 0.03 mm and preferably about 0.05 mm or greater and ionized in a vacuum with a high power IR laser (e.g., $CO_2$, 10.6 μm, about $10^7$–$10^9$ Watts/cm$^2$). The ionization of the thick layer may not be primarily a thermal desorption process as with thin layers because with the thick layer the laser pulse does not even reach the metallic, stainless steel, probe tip. Furthermore, nonlinear optical characteristics of such solid samples may produce higher order harmonics of the laser radiation. At the present time, the possibility cannot be ruled out that intractable polymers in the thick layer are undergoing photoionization as a result of multiple photon absorption in the intense IR field.

The thickness of the layer of polymer appears to be quite important in this method of ionization. The exact mechanism of ionization is not fully understood, but we think that the thickness of the layer becomes important in the following way. Laser heating and vaporization of a polymer should produce rotationally and vibrationally "hot" molecules in the plasma. Rapid expansion of these molecules into the vacuum should facilitate rotational cooling, but the molecules could still be vibrationally "hot." Molecules with excited vibrational states would be expected to undergo fragmentation unless the energy were dissipated by some other means. We observe little fragmentation but facile ionization of the polymer molecules, usually by loss of one electron. Yet infrared radiation does not have sufficient energy per quantum to eject electrons; multiple photons must be absorbed to reach the ionization continuum. We believe that in conjugated aromatic polymers the vibrational energy is dissipated by multiphoton excitation of higher energy levels, which results in loss of an electron. Thus undesirable fragmentation from excitation of vibrational states is diminished by a competing mechanism that is driven by vibrational excitation and which causes a desired mechanism for ionization. The thickness of the layer thus may be important for allowing sufficient quanta to be absorbed and for nonlinear optical properties of the polymer to yield higher order harmonics of the incident laser beam.

Other polymers that do not undergo photoionization from a thick layer in an intense IR field can be ionized by incorporating onto the layer a chemical moiety that readily photoionizes, e.g., an aromatic compound of sufficient conjugation length. Appropriate compounds for use to modify polymers for photoionization comprise a first reactive moiety that forms a covalent bond with a functional group on the polymer and a second moiety that readily photoionizes in an IR field. The reactive moieties include but are not limited to acid halide, alcohol, amine, and unsaturated functional groups that can participate in the formation of ester and amide bonds and addition across unsaturated functional groups in the polymer. The preferred moities that readily photoionize are conjugated aromatic compounds that are either commercial laser dyes or which are very similar in structure to the laser dyes. Organic and phthalocyanin type laser dyes with pendant reactive groups are especially preferred for this use and they permit the ionization, analysis, separation and plasma deposition of intractable polymers that cannot be ionized by prior art techniques.

The following is a list of chemical moieties that can be used as photoionizing compounds in the method of the present invention:

7-amino-4-methylcoumarin [Coumarin 440, Coumarin 120]
2-(4-biphenylyl)-5-phenyl-1,3,4-oxadiazole [PBD]
1,4-bis(2-methylstyryl)benzene [bis-MSB]
1,4-bis(5-phenyloxazol-2-yl)benzene [POPOP]
Cresyl violet perchlorate [Nile blue 690 perchlorate, Nile blue A perchlorate]
2',7'-dichlorofluorescein
7-diethylamino-4-methylcoumarin
1,1'-diethyl-4,4'-carbocyanine iodide
1,1'-diethyl-2,4'-cyanine iodide
3,3'-diethyl-9-methylthiacarbocyanine iodide
3,3'-diethyloxadicarbocyanine iodide [DODC iodide]
3,3'-diethylselenacarbocyanine iodine
3,3'-diethylthiacarbocyanine iodide [DTTC iodide]
3,3'-diethylthiadicarbocyanine iodide
3,3'-diethylthiatricarbocyanine iodide
4,6-dimethyl-7-(ethylamino)coumarin [Coumarin 2]
Fluorescein, water soluble [Fluorescein, disodium salt]
1,1',3,3,3',3'-hexamethylindodicarbocyanine iodide [HIDC iodide]
1,1',3,3,3',3'-hexamethylindotricarbocyanine iodide [HITC iodide]
7-hydroxy-4-methylcoumarin [4-Methylumbelliferone]
IR-140
p-Quaterphenyl Rhodamine B [Rhodamine 610 chloride, Rhodamine B chloride]
Rhodamine 6G [Rhodamine 590 chloride, Rhodamine 6G chloride]
Rhodamine 6G perchlorate [Rhodamine 590 perchlorate]
Rhodamine 6G tetrafluoroborate [Rhodamine 590 tetrafluoroborate]
Sulforhodamine 101 hydrate
p-Terphenyl
copper phthalocyanine
copper phthalocyanine-3,4′,4″,4‴-tetrasulfonic acid, tetrasodium salt
copper phthalocyaninetetrasulfonic acid, tetrasodium salt
nickel phthalocyaninetetrasulfonic acid, tetrasodium salt
29H,31H-phthalocyanine (metal-free phthalocyanine)

Many of the above compounds are available from the Aldrich Chemical Company of Milwaukee, WIS. In addition, laser dyes are commercially available from Polysciences, Inc. and Eastman Kodak Company.

The following is a list of the materials which have been ionized by the thick layer method of the present invention:

1. Poly(para-phenylene)

2. Mono-chlorinated poly(para-phenylene)
3. Mono-brominated poly(para-phenylene)
4. Di-chlorinated poly(para-phenylene)
5. Perdeuterated poly(para-phenylene)
6. Perdeuterated [Mono-chlorinated poly(paraphenylene)]
7.

8. The perdeuterated analogue of number 7.
8a. The monochlorinated analogue of 7.
9.

10. The complex mixture of products from reacting biphenyl with MoCl₅, including polynuclear structures.

11. The complex mixture of products from reacting biphenyl with AlCl₃-CuCl₂, inclulding polynuclear structures.
12. The complex mixture of products from reacting terphenyl with AlCl₃-CuCl₂, including polynuclear structures.
13. Quaterphenyl
14. Sexiphenyl
15. Poly(1-methyl-2,5-pyrrolylene)

R = CH₃

16. Mono-brominated poly(1-methyl-2,5-pyrrolylene)
17. Poly(1-phenyl-2,5-pyrrolylene)
18. Poly(2,5-thienylene)

19. Mono-brominated poly(2,5-thienylene)
20. Di-brominated poly(2,5-thienylene)
21. Poly(2,5-selenienylene)

22. Mono-brominated poly(2,5-selenienylene)
23. Di-brominated poly(2,5-selenienylene)
24. The complex mixture of products from reacting toluene with AlCl₃-CuCl₂.
25. Polymers of fluorene.
26. Polymers of 9,10-dihydrophenanthrene.
27. The complex mixture of products from reacting chlorobenzene with AlCl₃-CuCl₂.
28. The complex mixture of products from reacting pyrene with AlCl₃-CuCl₂.
29. The complex mixture of products from reacting naphthalene with AlCl₃-CuCl₂.
30. The complex mixture of products from reacting naphthalene with FeCl₃.
31. Polynaphthalene
32. Poly(phenylene sulfide)
33. Polyaniline
34. Nickel phthalocyanine
35. Cobalt phthalocyanine
36. Metal-free phthalocyanine
37. Einc tetrabenzoporphyrin
38. The product from reacting polyethylene glycol with 1-pyrenebutyric acid and 1,3-dicyclohexylcarbodiimide.

Laser Desorption/Fourier Transform Mass Spectrometry

Laser desorption/Fourier transform mass spectra of polymers can be recorded with instruments such as the Nicolet FTMS-1000 spectrometer equipped with a Nicolet laser desorption interface and a Tachisto Tac-II pulsed $CO_2$ laser (10.6 $\mu$m). Since FTMS operates in a "pulsed" mode in which ions of different masses are detected simultaneously, this technique is well suited for detection of ions produced by sample desorption with a pulsed laser. Although ions can be produced within such spectrometers by other techniques such as electron impact or chemical ionization, this description is limited to the use of a pulsed IR-laser.

Figure 1:
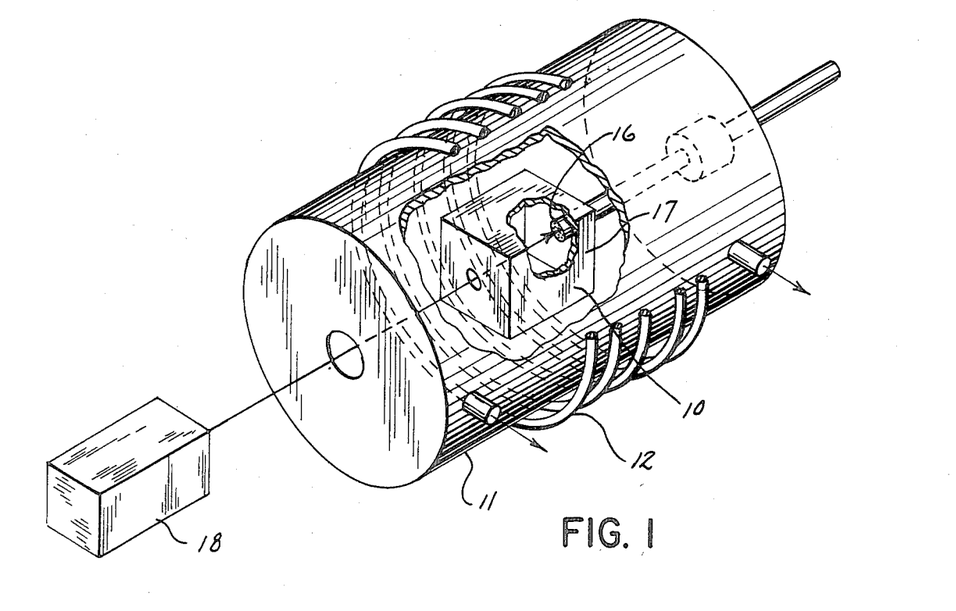
FIG. 1 is a schematic drawing showing a laser, a vacuum chamber, a magnet, an analysis cell and a probe tip with a polymer being ionized therefrom.

The preferred apparatus for practicing the method of the present invention is shown schematically in FIG. 1. As seen therein, the analysis cell 10 is located in a vacuum chamber 11 within a solenoid superconducting magnet 12.

Figure 2:
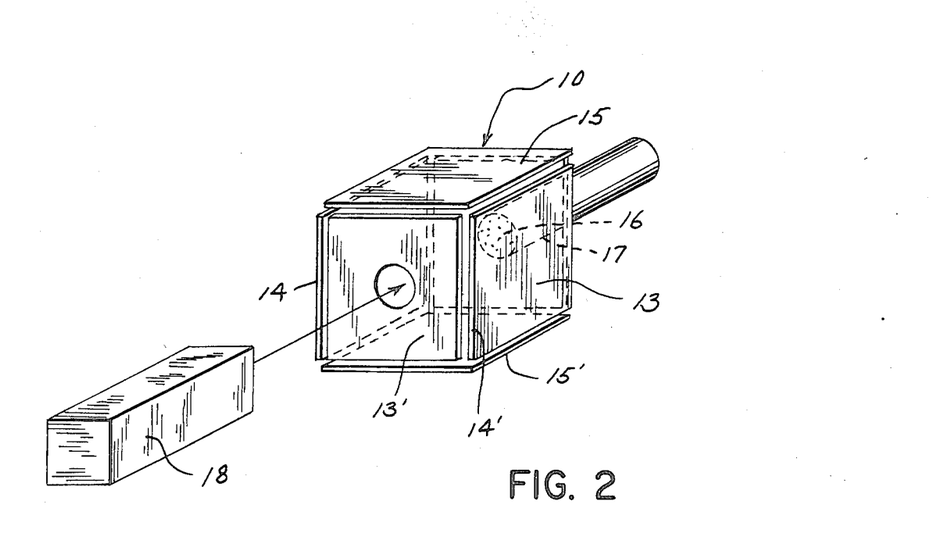
FIG. 2 is an enlarged view of the analysis cell of FIG. 1.

As seen in FIG. 2 the cell 10 has two opposing trap plates 13, 13', which are perpendicular to the lines of flux of the magnetic field, B, and pairs of opposing transmitter and receiver plates 14, 14' and 15, 15' respectively, are parallel to the lines of flux. These three pairs of plates are used in a repetitive sequence of events that are separated in time to obtain a mass spectrum. The function of ion formation, detection and analysis is performed by the FTMS within the single analysis cell.

Referring to FIGS. 1 and 2 it is seen that a thick layer 16 of the polymer is on the surface of the stainless steel probe tip 17, which is in the vacuum chamber 11 and positioned adjacent to the outside face of one of the trap plates 13. In the method after the vacuum chamber 11 has been pumped down, nominally to $10^{-8}-10^{-9}$ torr, the analysis cell 10 is cleared of any extraneous ions by applying a positive potential to one trap plate 13 and a negative potential to the other trap plate 13'.

Next, one chooses whether positive or negative ions are to be detected. This is accomplished by making the ion ntrapping potential (i.e., a low DC voltage on both trap plates) either positive or negative, respectively. If both trap plates 13, 13' are made positive, then positive ions formed in the next step will be trapped within the analyzsis cell 10, whereas any negative ions that might be formed will be attracted to the trap plates 13, 13' and thereby removed from the cell. The opposite will be true if both trap plates 13, 13' are made negative. Both positive and negative ion mass spectra routinely are recorded of each sample.

A small area of the thick layer 16 sample of polymer on the probe tip 17 (i.e., a circle about 1 mm in diameter) then is irradiated with a pulse of intense IR from a $CO_2$ laser 18. This causes the polymer molecules to enter the gas phase and ionize. After entering the analysis cell through holes in the trap plate 13, 13', the ions to be detected (e.g., positive) are trapped within the analysis cell. Ions of opposite charge (e.g., negative) are lost on the trap plates 13, 13'.

The ions thus formed rotate in circular paths perpendicular to the magnetic field axis with a natural cyclotron frequency, f, which is proportional to the fixed magnetic field strength, B, and inversely proportional to the ion's mass-to-charge ratio, m/z:

$$f = k \times B/(m/z) \quad (1)$$

where k is a constant. These ions are thus forced to move in very small orbits under the influence of the magnetic field. They all rotate at their natural cyclotron frequencies, but they initially move in a random, non-coherent fashion. This non-coherent motion does not produce a detectable signal.

In order to detect the ions of interest, they must be excited into coherent orbital motion. This is done by applying a very fast frequency-sweep voltage to the transmitter plates 14, 14' following the ionization event. This radiofrequency sweep covers all of the cyclotron frequencies corresponding to the range of masses of interest (i.e., from a few kHz to a few MHz for a 3 Tesla magnetic field, B). When the excitation RF frequency becomes equal to the natural cyclotron frequency of a given ion (i.e., the requirement for resonance), the ion absorbs energy and moves into an expanding spiral path until the excitation is ended. After a very short time of interaction with the RF field, all ions move in coherent motion in a circular orbit of larger radius. The ions to be detected are not permitted to spiral into such a large orbit that they collide with the walls of the analysis cell 10.

The coherent motion of the excited ions induces "image currents" in the receiver circuit. Positive ions approaching one receiver plate 15 attract electrons. As they continue IO to move in their orbits, they approach the opposite receiver plate 15' and attract electrons on this surface. When the receiver plates 15, 15' are connected in a circuit, the induced image currents of ions can be detected in the form of a "time domain" signal. This is composed of sine waves having the same frequencies as the natural cyclotron frequencies of the ions present and amplitudes proportional to the number of ions present in the cell. Multiple, coherently moving ions produce a signal with an amplitude that is proportional to the number of ions present in the orbit. The actual time domain signal is the composite of all sine wave frequencies corresponding to the different ion species coherently orbiting at the same time.

The time domain signal is amplified and digitized for storage in computer memory. By repeating the above sequence of events and averaging the time domain signals obtained, the signal-to-noise ratio can be improved. The probe tip is turned slightly after each acquisition to expose new polymer to the next laser pulse.

A mass spectrum is obtained by converting the time domain signal to a frequency domain spectrum with a fast Fourier transform (FFT) computer algorithm. The FFT is a mathematical process of sorting out the composite time-domain signal into its individual component frequencies. The Fourier transform of the time domain signal can be relabeled as a mass spectrum once the relationship between mass and frequency is established, either by calibration with a reference compound or by application of a mass measurement equation.

Example of Analysis of Polymers by Laser Desorption/Fourier Transform Mass Spectrometry A thick layer of poly(p-phenylene) (PPP), which is insoluble and nonvolatile, when indicated as described above, yields almost exclusively molecular ions in the high mass range in the presence of pulsed, high power IR-laser irradiation. One need not add KBr to the probe tip to facilitate ionization. Peaks in the positive ion mass spectra appear to arise from molecules that have only lost one electron. Such positive ions are obtained with most linear benzenoid aromatic polymers, of which PPP is an example, and analogues of these with a halogen substituted at either or both end rings. Highly halogenated analogues yield predominantly negative ion mass spectra in which each molecule appears to have gained one electron. Extended polynuclear moieties with "chickenwire" structures yield both positive and negative ion mass spectra, and graphite-like structures of high mass have been detected.

Thick layers of heterocyclic aromatic polymers also ionize in the presence of pulsed, high power IR-laser irradiation to yield ions in the high mass range. Poly (1-methyl-2,5-pyrrolylene), poly(1-phenyl-2,5-pyrrolylene), poly(2,5-thienylene) and poly(2,5-selenienylene) have been tested to date. Poly(1-methyl-2,5-pyrrolylene) and poly(2,5-thienylene) appear to yield molecular ions. Poly(1-phenyl-2,5-pyrrolylene) undergoes limited fragmentation during LD/FTMS. Unlike the other heterocyclic aromatic polymers tested, poly(2,5-selenienylene) yields only a negative ion mass spectrum. The complex isotopic composition of selenium makes it difficult to ascertain whether fragmentation of this polymer occurs.

Figure 3A:
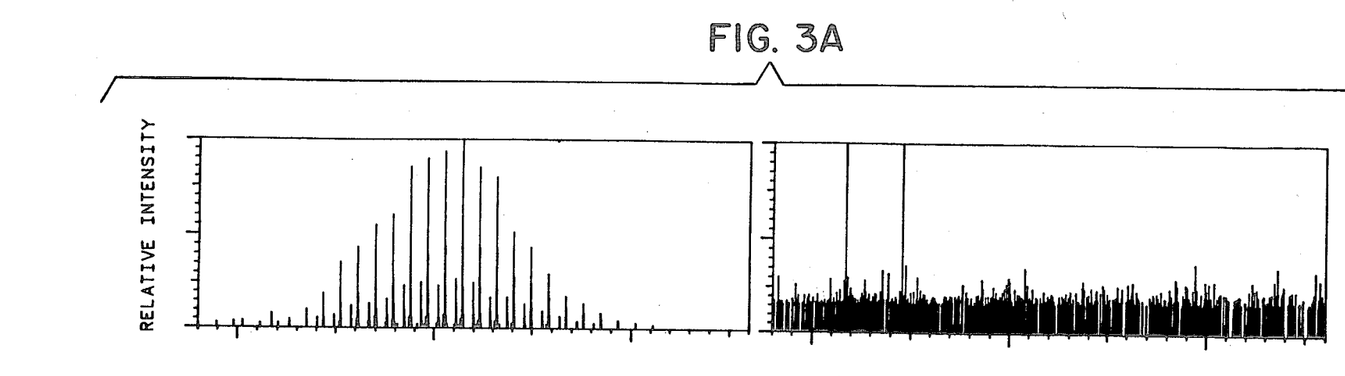
FIG. 3 is laser desorption/Fourier transform mass spectra of FIG. 3(A) poly(ethylene glycol)-1000 and FIG. 3(B) the product from reacting poly(ethylene glycol)-1000, 1-pyrenebutyric acid and 1,3-dicyclohexylcarbodiimide at 100° C. Positive ion spectra are given on the left, and negative ion spectra are on the right.
Figure 3B:
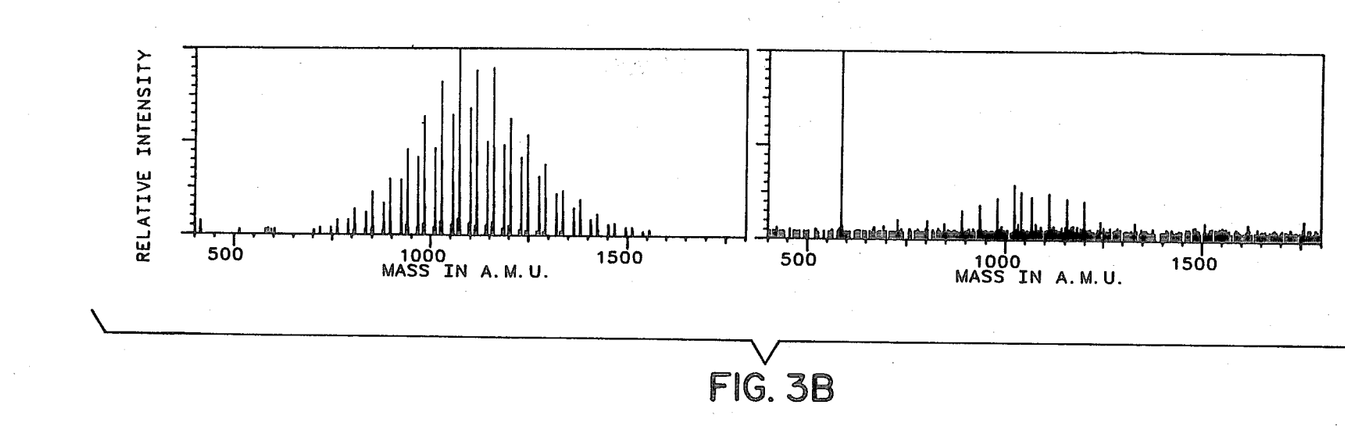
Figure 4:
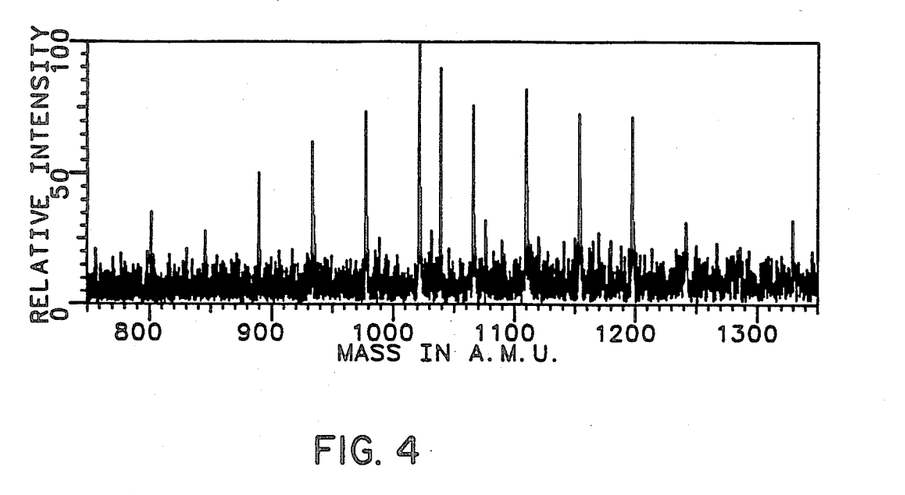
FIG. 4 is an expansion of the negative ion laser desorption/Fourier transform mass spectrum in FIG. 3.

A demonstration of the novel concept of modifying polymers such that they will ionize in the presence of a pulsed IR field is presented in FIGS. 3 and 4. Poly (ethylene glycol)-1000 yields a positive-ion, but not a negative-ion, laser desorption/Fourier transform mass spectrum [FIG. 3(A)]. The positive ions are sodium and potassium adducts of poly(ethylene glycol) oligomers, which did not themselves ionize during desorption. Since no metal salts were added, the $Na^+$ and $K^+$ ions arise from contaminants in the polymer sample. Reaction of poly(ethylene glycol)-1000 with 1-pyrenebutyric acid and 1,3-dicyclohexylcarbodiimide at 100° C. results in both positive and negative ion laser desorption/Fourier transform mass spectra [FIG. 3(B)]. The positive ion mass spectrum clearly arises from $Na^+$ and $K^+$ adducts of poly(ethylene glycol) oligomers that did not react with the 1-pyrenebutyric acid/13-dicyclohexylcarbodiimide. However, the negative ion mass spectrum arises from ionization of chemically modified poly(ethylene glycol) oligomers. The difference in mass between oligomers is 44 amu, the mass of the monomer repeat unit of poly(ethylene glycol) [FIG. 4].

Deposition of Polymer onto a Substrate

Surfaces with appropriate charge gradients relative to a source of ions attract the ions produced. This is done routinely during the LD/FTMS pulse sequence described above. A coating of material builds up on the detector cell of the spectrometer, which must be removed periodically. Polymer ions can be deposited on selected substrates in a similar fashion to fabricate thin polymer coatings. Since LD/FTMS techniques permit isolation of desired ionic species, the coating can be composed of an oligomer of known chain length isolated from the starting polymer sample.

A number of practical applications arise from these observations. The deposition of very thin layers of polymers on substrates composed of other materials (i.e., conductors, semiconductors or insulators) can be accomplished by placing the substrate in the path of molecular ions of these polymers. The molecular ions could be produced by laser irradiation and separated as described above with FTMS, then accelerated toward the substrate by maintaining an appropriate charge gradient on the "target." Such a procedure holds the promise of overcoming problems with mismatches of crystal lattices at interfaces and of providing a means of fabricating useful components from intractable polymers.

Since the benzenoid and heterocyclic aromatic polymers readily form stable molecular ions by laser desorption, photoionization provides a means of fabricating multilayer components from them. These polymers become electrically conductive upon doping, and thus electrical and circuitry components could be produced. Other polymers that do not readily photoionize could be used in such fabrication procedures after they are modified with moieties that do so.

Experimental a. Preparation of Samples

The benzenoid and heterocyclic aromatic polymers are prepared by previously reported synthetic routes.

Polymers that do not undergo photoionization by multiple photon absorption in an intense IR field are modified by incorporating a photoionizing chemical, such as an aromatic compound of sufficient conjugation length. Organic and phthalocyanin type laser dyes with pendant reactive groups are the preferred materials for enabling polymers to photoionize in an IR field.

The sample that gave rise to the spectra in FIGS. 3(B) and 4 was prepared by reacting poly(ethylene glycol)-1000 with 1-pyrenebutyric acid and 1,3-dicyclohexlcarbodiimide at 100° C.

b. Laser Desorption/Fourier Transform Mass Spectrometry

Soluble samples are deposited onto the probe tip by evaporation of the solvent from an appropriate solution. This technique produces a thin layer of polymer on the stainless steel probe tip. Insoluble polymers are deposited by compressing or compacting the powdered polymer sample between the probe tip and a piece of paper or metal foil. The paper or foil then is peeled away to expose a solid deposit adhering to the stainless steel. Compressed samples that do not adhere well to form a thick layer can be affixed with double stick tape. This technique can be used to deposit a layer of polymer up to several mm thick.

Laser desorption/Fourier transform mass spectra of polymers are recorded with instruments such as the Nicolet FTMS-1000 spectrometer equipped with a Nicolet laser desorption interface and a Tachisto Tac-II pulsed $CO_2$ laser (10.6 $\mu$m). After the spectra are recorded, the remaining polymer is removed from the probe tip with appropriate solvents and/or a file and emery cloth.

c. Deposition of Polymer onto a Substrate

Ions moving in circular paths at their natural cyclotron frequencies within the Fourier transform mass spectrometer or similar magnetic field and vacuum chamber are available for subsequent chemistry. Undesired ions can be removed from the analysis cell by high-intensity irradiation at their respective cyclotron frequencies. The remaining trapped ions then are deposited onto a target by putting a potential on the target of opposite sign from that of the ions. A potential of less than a volt is sufficient, but the optimum potential is determined by the identities of the ions and target and the desired properties of the coating.

Large scale preparations also appear feasible. After photoionization of the polymer is made possible by incorporation of an ionizable moiety, a plasma of ions can be produced by irradiation of the polymer in a vacuum space with an IR laser. These ions then can be deposited onto the substrate "target" to produce a coating by maintaining the appropriate potential gradient.

It will be readily apparent to those skilled in the art that a number of modifications and changes can be made without departing from the spirit and scope of the present invention. For example, although conjugated aromatic moieties that resemble laser dyes have been used, other chemical moieties that are ionized by infrared irradiation can be used. Furthermore, although Fourier transform mass spectrometers provide the optimum spectral resolution, mass spectrometers that operate in other ways, such as those based on time-of-flight techniques, may be employed and are intended to be covered. In addition, although oligomers were separated for purposes of illustration on the basis of the natural cyclotron frequencies of their ions, other means of separation can be used, if desired and acceptable under the circumstances of use. Therefore, it is intended that the invention not be limited except by the claims which follow.

References

1. "Applications of Mass Spectrometry to Polymers," H.-R. Schulten and R. P. Lattimer, *Mass Spectrom. Rev.*, 3, 231 (1984).
2. "Laser Desorption/Fourier-Transform Mass-Spectral Analysis of Molecular Weight Distribution and End-Group Composition of Poly(p-phenylene)s Synthesized by Various Routes," C. E. Brown, P. Kovacic, C. A. Wilkie, R. B. Cody, Jr. and James A. Kinsinger, *J. Polym. Sci. Polym. Lett. Ed*. 23, 453 (1985).
3. "Polynuclear and Halogenated Structures in Polyphenylenes Synthesized from Benzene, Biphenyl, and p-Terphenyl Under Various Conditions: Characterization by Laser Desorption/Fourier Transform Mass Spectrometry," C. E. Brown, P. Kovacic, C. A. Wilkie, J. A. Kinsinger, R. E. Hein, S. I. Yaniger and R. B. Cody, Jr., *J. Polym. Sci. Polym. Chem. Ed.*, 24, 255–267 (1986).
4. "Laser Desorption/Fourier Transform Mass Spectral Analysis of Various Conducting Polymers," C. E. Brown, P. Kovacic, C. A. Wilkie, R. B. Cody, Jr., R. E. Hein and J. A. Kinsinger, in "Proceedings of the Workshop on Conductive Polymers, Brookhaven National Laboratory, Oct. 7–9, 1985," *Syn. Metals*, in press (1986).
5. "Multiple Photon Infrared Laser Photochemistry," R. V. Ambartzumian and V. S. Letokhov, in *Chemical and Biochemical Applications of Lasers, Vol. III* (C. B. Moore, ed.), Academic Press, New York, 1977, p. 167.
6. "Surface Analysis by Nonresonant Multiphoton Ionization of Desorbed or Suttered Species," C. H. Becker and K. T. Gillen, *Anal. Chem.*, 56, 1671 (1984).
7. "Laser Resonance Ionization Mass Spectrometry," J. D. Fassett, L. J. Moore, J. C. Travis and J. R. DeVoe, Science, 230, 262 (1985).

I claim:

1. A method of volatilizing, ionizing and depositing a coating of intact and uncontaminated intractable polymer on a target substrate without fragmentation which method comprises forming a layer of the polymer over about 0.03 mm thick on the tip of a probe, placing the probe tip with the layer of polymer and a target substrate in a vacuum chamber, maintaining charge gradient between polymer and the target substrate effective to attact the ionized polymer molecules to the substrate, and then subjecting said polymer to pulsed, high power IR-laser radiation to cause facile ionization of the polymer molecules which because of the charge gradient are deposited as a coating on the target substrate.

2. The method of claim 1 in which the IR-laser is a carbon diodixe laser.

3. The method of claim 1 in which the laser is $CO_2$ laser having a wavelength of about 10.6 $\mu$m and about $10^7$–$10^9$ watts/cm$^2$.

4. The method of claim 1 in which the polymer is selected from the class consisting of:

(a) Poly(para-phenylene)

(b) Mono-chlorinated poly(para-phenylene),
(c) Mono-brominated poly(para-phenylene),
(d) Di-chlorinated poly(para-phenylene),
(e) Perdeuterated poly(para-phenylene),
(f) Perdeuterated [Mono-chlorinated poly(para-phenylene)],
(g)

(h) The perdeuterated analogue of g.
(i) The monochlorinated analogue of g.
(j)

(k) The complex mixture of products from reacting biphenyl with $MoCl_{35}$, including polynuclear structures,
(l) The complex mixture of products from reacting biphenyl with $AlCl_3$–$CuCl_2$, including polynuclear structures,
(m) The complex mixtures of products from reacting terphenyl with $AlCl_3$–$CuCl_2$, including polynuuclear structures,
(n) Quaterphenyl,
(o) Sexiphenyl,
(p) Poly(1-methyl-2,5-pyrrolylene),

R = CH₃

(q) Mono-brominated poly(1-methyl-2,5-pyrrolylene),
(r) Poly(1-phenyl-2,5-pyrrolylene),
(s) Poly(2,5-thienylene), (t) Mono-brominated poly(2,5-thienylene),
(u) Di-brominated poly(2,5-thienylene),
(v) Poly(2,5-selenienylene), (w) Mono-brominated poly(2,5-slenienylene),
(x) Di-brominated poly(2,5-selenienylene),
(y) The complex mixture of products from reacting toluene with $AlCl_3$–$CuCl_2$,
(z) Polymers of fluorene,
(aa) Polymers of 9,10-dihydrophenanthrene,
(bb) The complex mixture of products from reacting chlorobenzene with $AlCl_3$–$CuCl_2$,
(cc) The complex mixture of products from reacting pyrene with $AlCl_3$–$CuCl_2$,
(dd) The complex structure of products from reacting naphthalene with $AlCl_3$–$CuCl_2$,
(ee) The complex mixture of products from reacting naphthalene with $FeCl_3$,
(ff) Polynapthalene,
(gg) Poly(phenylene sulfide),
(hh) Polyaniline,
(ii) Nickel phthalocyanine,
(jj) Cobalt phthalocyanine,
(kk) Metal-free phthalocyanine,
(ll) Zinc tetrabenzoporphyrin, and
(mm) The product from reacting polyethylene glycol with 1-pyrenebutyric acid and 1,3-dicyclohexylcarbodiimide.

5. The method of claim 1 in which the polymer on the probe tip has incorporated therein a chemical moiety that readily photoionizes in an intense IR field.

6. The method of claim 5 in which the chemical moiety is a member selected form the class consisting of:
(a) 7-amino-4-methylcoumarin [Coumarin 440, Coumarin 120],
(b) 2-(4-biphenylyl)-5-phenyl-1,3,4-oxadiazole [PBD],
(c) 1,4-bis(2-methylstyryl)benzene [bis-MSB],
(d) 1,4-bis(5-phenyloxazol-2-yl)benzene [POPOP],
(e) Cresyl violet perchlorate [Nile blue 690 perchlorate,, Nile blue A perchlorate],
(f) 2',7'-dichlorofluorescein,
(g) 7-diethylamino-4-methylcoumarin,
(h) 1,1'-diethyl-4,4-carbocyanine iodide,
(i) 1''-diethyl-2,4'-cyanine iodide,
(j) 3,3'-diethyl-9-methylthiacarbocyanine iodide,
(k) 3,3'-diethyloxadicarbocyanine iodide [DODC iodide],
(l) 3,3'-diethylselenacarbocyanine iodide,
(m) 3,3'-diethylthiacarbocyanine iodide [DTTC iodide],
(n) 3,3'-diethylthiadicarbocyanine iodide,
(o) 3,3'-diethylthiatricarbocyanine iodide,
(p) 4,6-dimethyl-7-(ethylamino)coumarin [Coumarin 2],
(q) Fluorescein, water soluble [Fluorescein, disodium salt],
(r) 1,1',3,3,3',3'-hexamethylindodicarbocynine iodide [HIDC iodide],
(s) 1,1',3,3,3',3'-hexamethylindotricarbocyanine iodide [HITC iodide],
(t) 7-hydroxy-4-methylcoumarin [4-Methylumbelliferone],
(u) Polynuclear structures,
(v) pyrenebutyric acid,
(w) p-Quaterphenyl,
(x) Rhodamine B [Rhodamine 610 chloride, Rhodamine B chloride],
(y) Rhodamine 6G [Rhodamine 590 chloride, Rhodamine 6G chloride],
(z) Rhodamine 6G perchlorat [Rhodamine 590 perchlorate],
(aa) Rhodamine 6G tetrafluoroborate [Rhodamine 590 tetrafluoroborate],
(bb) Sulforhodamine 101 hydrate,
(cc) p-Terphenyl,
(dd) copper phthalocyanine,
(ee) copper phthalocyanine-3,4',4'',4,'''-tetrasulfonic acid, tetrasodium salt,
(ff) copper phthalocyaninetetrasulfonic acid, tetrasodium salt,
(gg) nickel phthalocyaninetetrasulfonic acid, tetrasodium salt,
(hh) 29H,31H-phthalocyanine (metal-free phthalocyanine), and
(ii) Low-molecular-weight analogues of the polymers in claim 4.

* * * * *